US011426882B2

(12) United States Patent
Takahashi et al.

(10) Patent No.: US 11,426,882 B2
(45) Date of Patent: Aug. 30, 2022

(54) GRIPPING TOOL, GRIPPING SYSTEM, AND METHOD FOR MANUFACTURING RESIN MEMBER

(71) Applicant: KABUSHIKI KAISHA TOSHIBA, Minato-ku (JP)

(72) Inventors: Hiromasa Takahashi, Minato (JP); Noriyuki Ooba, Yokohama (JP); Shintaro Enami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 199 days.

(21) Appl. No.: 16/822,100

(22) Filed: Mar. 18, 2020

(65) Prior Publication Data
US 2020/0215701 A1 Jul. 9, 2020

Related U.S. Application Data

(63) Continuation of application No. PCT/JP2018/033963, filed on Sep. 13, 2018.

(30) Foreign Application Priority Data

Sep. 26, 2017 (JP) .............................. JP2017-185393

(51) Int. Cl.
*B25J 15/12* (2006.01)
*B25J 15/00* (2006.01)
*B25J 15/06* (2006.01)

(52) U.S. Cl.
CPC ............ *B25J 15/12* (2013.01); *B25J 15/0023* (2013.01); *B25J 15/06* (2013.01)

(58) Field of Classification Search
CPC ........ B25J 15/12; B25J 15/0023; B25J 15/06; B25J 15/0616; B29C 39/24; B29C 39/26
See application file for complete search history.

(56) References Cited

U.S. PATENT DOCUMENTS 3,318,629 A * 5/1967 Brandt, Jr. ............. A01D 46/26
294/103.1
4,194,424 A 3/1980 O'Rourke et al.
(Continued)

FOREIGN PATENT DOCUMENTS

JP 10-235586 A 9/1998
JP 10-249775 A 9/1998
(Continued)

OTHER PUBLICATIONS

International Search Report and Written Opinion dated Jun. 11, 2018 in PCT/JP2018/033963 (with English Translation of Category of Cited Documents) 12 pages.

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper. The gripper is flexible and includes a first portion contacting a workpiece, a second portion opposing the first portion, and a granular material provided between the first portion and the second portion. The first portion includes a concave portion and a convex portion. The concave portion is recessed in a first direction. The first direction is from the first portion toward the second portion. The convex portion is provided around the concave portion and protrudes in a second direction. The second direction is the reverse of the first direction. The concave portion has a groove having a ring configuration recessed outward from a center of the gripper.

19 Claims, 10 Drawing Sheets

(56) References Cited

U.S. PATENT DOCUMENTS

| | | | |
|---|---|---|---|
| 4,294,424 A | 10/1981 | Teissier | |
| 8,548,626 B2 * | 10/2013 | Steltz | B25J 15/0023 |
| | | | 700/245 |
| 2008/0213593 A1 * | 9/2008 | Bala Subramaniam | |
| | | | B01F 13/0062 |
| | | | 428/402.2 |
| 2013/0033050 A1 * | 2/2013 | Matsuoka | B25J 15/0023 |
| | | | 294/86.4 |
| 2017/0072572 A1 | 3/2017 | Wagner et al. | |
| 2019/0217482 A1 | 7/2019 | Ishida et al. | |

FOREIGN PATENT DOCUMENTS

| | | |
|---|---|---|
| JP | 2012-176476 A | 9/2012 |
| JP | 2012-236239 A | 12/2012 |
| JP | 2013-022723 A | 2/2013 |
| JP | 2016-97496 A | 5/2016 |
| JP | 2018-149640 A | 9/2018 |

* cited by examiner

GRIPPING TOOL, GRIPPING SYSTEM, AND METHOD FOR MANUFACTURING RESIN MEMBER

CROSS-REFERENCE TO RELATED APPLICATIONS

This is a continuation application of International Application PCT/JP2018/033963, filed on Sep. 13, 2018. This application also claims priority to Japanese Patent Application No. 2017-185393, filed on Sep. 26, 2017. The entire contents of each are incorporated herein by reference.

FIELD

Embodiments described herein relate generally to a gripping tool, a gripping system, and a method for manufacturing a resin member.

BACKGROUND

There is a gripping tool that includes a gripper having a granular material provided in the interior of the gripper. The gripper of the gripping tool is caused to contact a workpiece; and the workpiece is gripped by solidifying the interior of the gripper by depressurizing. A high gripping force of the gripping tool is desirable.

DETAILED DESCRIPTION

Figure 1:
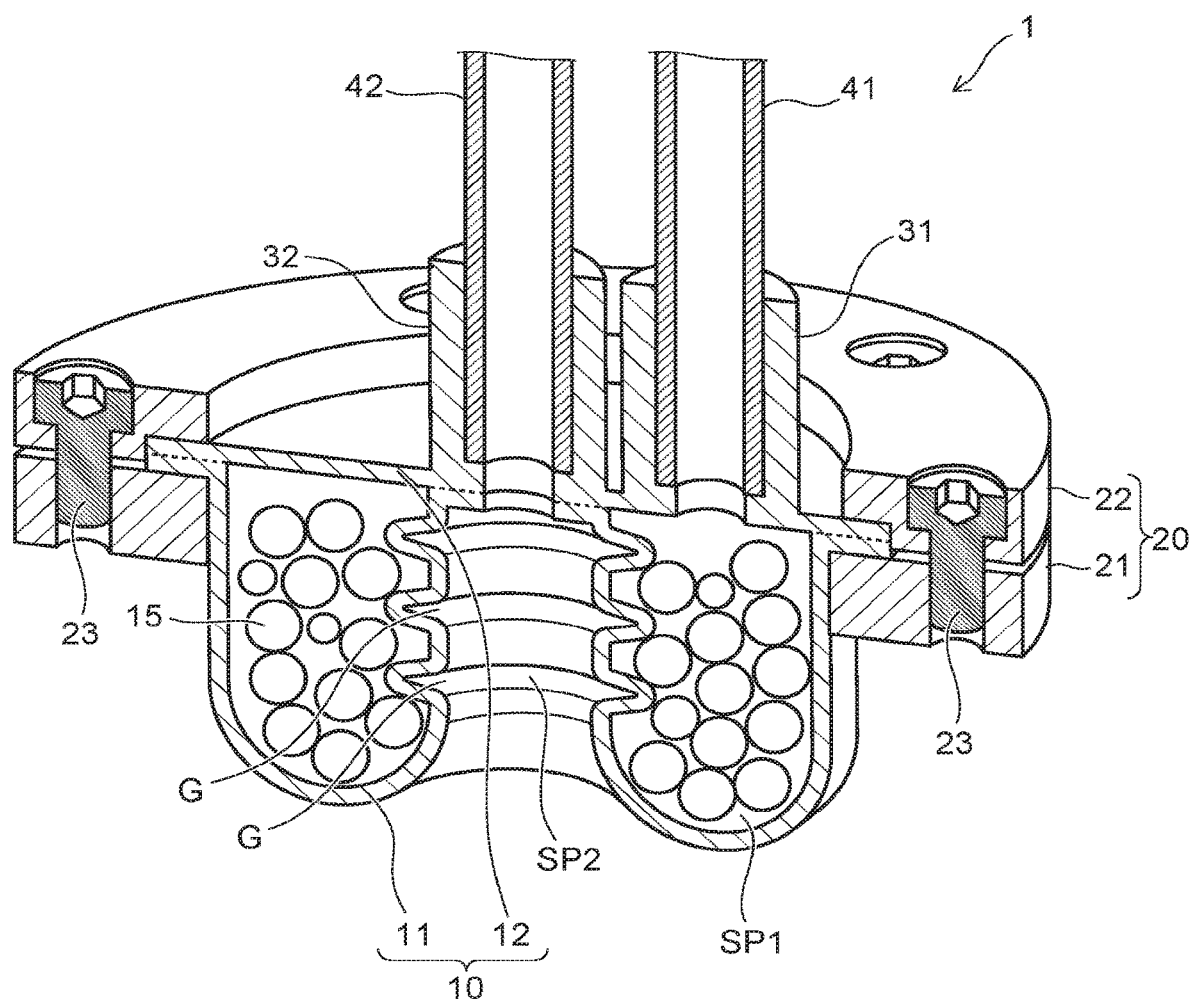
FIG. 1 is a perspective cross-sectional view illustrating a gripping tool according to a first embodiment.

According to one embodiment, a gripping tool includes a gripper. The gripper is flexible and includes a first portion contacting a workpiece, a second portion opposing the first portion, and a granular material provided between the first portion and the second portion. The first portion includes a concave portion and a convex portion. The concave portion is recessed in a first direction. The first direction is from the first portion toward the second portion. The convex portion is provided around the concave portion and protrudes in a second direction. The second direction is the reverse of the first direction. The concave portion has a groove having a ring configuration recessed outward from a center of the gripper.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a perspective cross-sectional view illustrating a gripping tool 1 according to a first embodiment.

The gripping tool 1 according to the first embodiment includes a gripper 10 that is flexible. A granular material 15 is provided in the interior of the gripper 10.

Specifically, the gripper 10 includes a first portion 11 contacting a workpiece to be gripped, and a second portion 12 opposing the first portion 11. The first portion 11 and the second portion 12 include flexible materials such as a silicone resin, a rubber material, an acrylic resin, etc. The granular material 15 is provided in a first space SP1 between the first portion 11 and the second portion 12. The gripper 10 is configured by, for example, bonding the first portion 11 and the second portion 12 via a bonding agent. The first portion 11 and the second portion 12 may be bonded by thermal compression bonding.

The outer perimeter of the first portion 11 and the outer perimeter of the second portion 12 are held by a holder 20. Thereby, the first space SP1 is separated from an external space. The holder 20 has, for example, a circular ring configuration. Because only the outer perimeter of the gripper 10 is held by the holder 20, the gripper 10 can deform inside the holder 20 in the direction of a line connecting the first portion 11 and the second portion 12.

The direction of the line connecting the first portion 11 and the second portion 12 is, for example, along the vertical direction. The direction of the line connecting the first portion 11 and the second portion 12 includes a first direction (up) from the first portion 11 toward the second portion 12, and a second direction (down) from the second portion 12 toward the first portion 11. Hereinbelow, the description of the embodiments is performed using "vertical direction", "up/above", and "down/below" based on the positional relationship between the first portion 11 and the second portion 12.

As an example, the holder 20 includes a first flange 21 and a second flange 22. The first flange 21 abuts the outer perimeter lower surface of the first portion 11. The second flange 22 abuts the outer perimeter upper surface of the second portion 12. The gripper 10 is held by fastening the first flange 21 and the second flange 22 using a fastener 23 such as a screw, etc.

Figure 2:
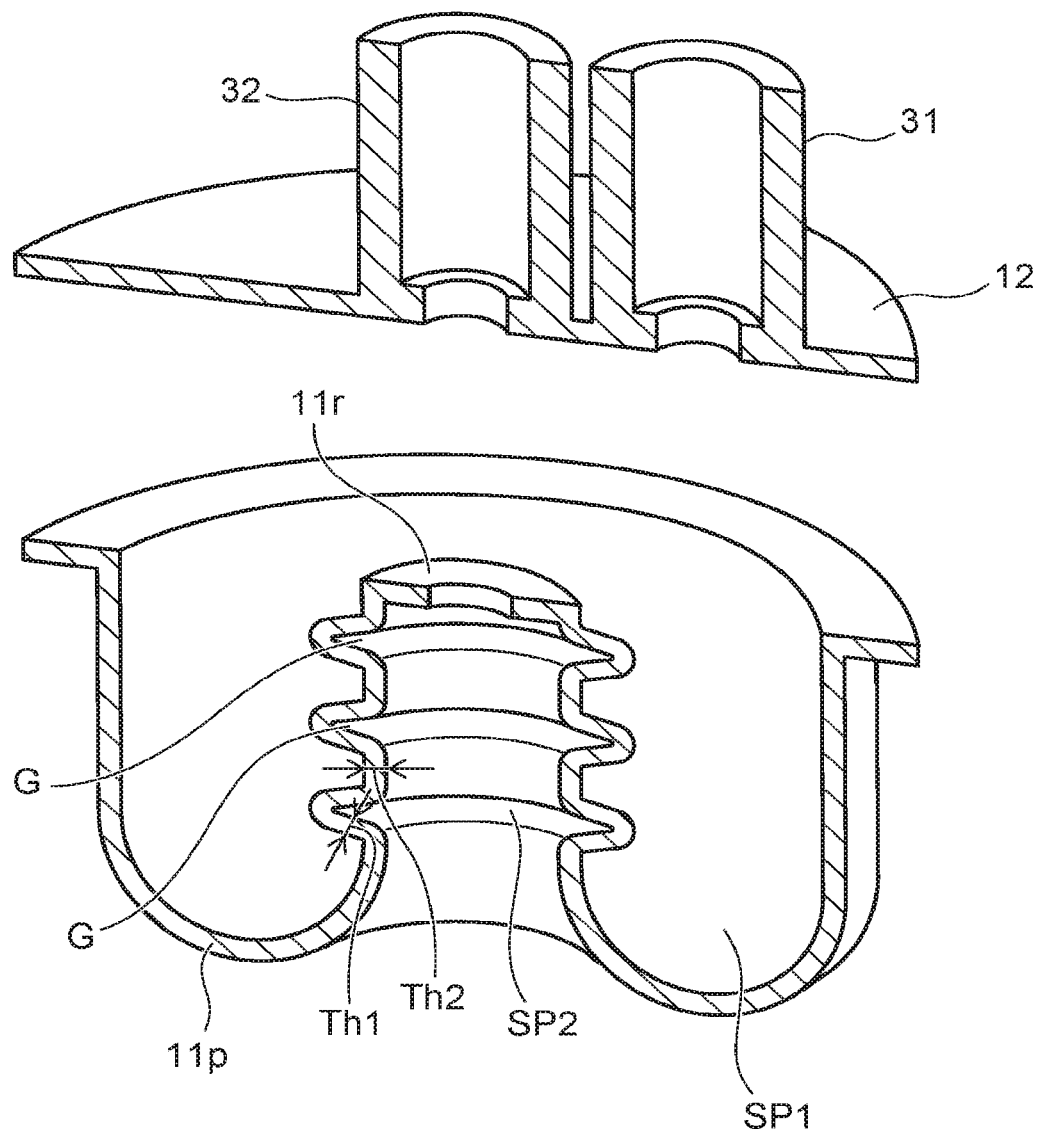
FIG. 2 is a perspective cross-sectional view illustrating a gripper of the gripping tool according to the embodiment.

FIG. 2 is a perspective cross-sectional view illustrating the gripper 10 of the gripping tool 1 according to the embodiment.

The first portion 11 and the second portion 12 of the gripper 10 are illustrated as being separated in FIG. 2.

As illustrated in FIG. 2, the first portion 11 includes a concave portion 11r and a convex portion 11p. The concave portion 11r is recessed upward and is provided at the center of the gripper 10. The convex portion 11p protrudes downward and is provided around the concave portion 11r. The convex portion 11p and the concave portion 11r are continuous with each other.

The upper surface of the concave portion 11r contacts the second portion 12. The convex portion 11p is separated from the second portion 12 in the vertical direction. In the gripping tool 1 illustrated in FIG. 1 and FIG. 2, the first space SP1 is formed between the convex portion 11p and the second portion 12.

A second space SP2 which is surrounded with the concave portion 11r and the convex portion 11p is formed below the first portion 11. Specifically, the top of the second space SP2 is covered with the concave portion 11r. The side of the second space SP2 is surrounded with the convex portion 11p. The bottom of the second space SP2 is open. As described below, the second space SP2 is sealed from the external space by the workpiece to be gripped being positioned below the second space SP2.

As illustrated in FIG. 1 and FIG. 2, the gripper 10 further includes a first port 31 and a second port 32. The first port 31 communicates with the first space SP1. The second port 32 pierces the second portion 12 and the concave portion 11r of the first portion 11 and communicates with the second space SP2. The diameter (the dimension in a direction perpendicular to the vertical direction) of the concave portion 11r is less than the diameter of the second port 32. A first pipe 41 for depressurizing the first space SP1 is connected to the first port 31. A second pipe 42 for depressurizing the second space SP2 is connected to the second port 32.

In the gripping tool 1 according to the first embodiment, a groove G also is provided in the concave portion 11r. The groove G is recessed in the diametrical direction outward from the center of the gripper 10. In other words, the diametrical direction is a third direction from the concave portion 11r toward the convex portion 11p and is perpendicular to the vertical direction. The groove G is provided in a ring configuration along a circumferential direction orthogonal to the diametrical direction.

In the example illustrated in FIG. 1, multiple grooves G are separated from each other in the vertical direction. The diameter of the concave portion 11r changes periodically in the vertical direction. In other words, in the example illustrated in FIG. 1, a bellows-like structure that is expandable/contractible in the vertical direction is provided in the concave portion 11r. For example, as illustrated in FIG. 2, a thickness Th1 of the portion of the concave portion 11r where the groove G is provided is substantially the same as a thickness Th2 of the portion of the concave portion 11r between the grooves G.

FIGS. 3A to 3D are cross-sectional views illustrating a gripping method using the gripping tool 1 according to the first embodiment.

FIGS. 3A to 3D illustrate an example in which a hemispherical workpiece is gripped by the gripping tool 1.

Figure 3A:
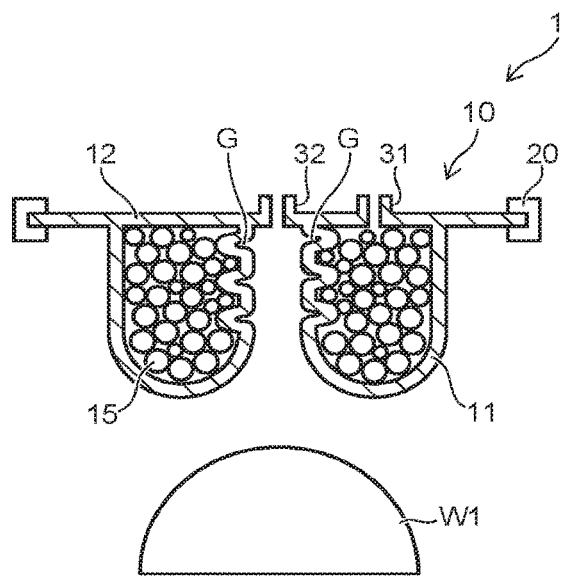
FIGS. 3A to 3D are cross-sectional views illustrating the operation of the gripping tool according to the first embodiment.

First, as illustrated in FIG. 3A, the position in the horizontal direction of the gripper 10 and the position in the horizontal direction of a workpiece W are aligned. Then, the gripper 10 is lowered toward the workpiece W; and the gripper 10 (the first portion 11) is caused to contact the workpiece W.

Figure 3B:
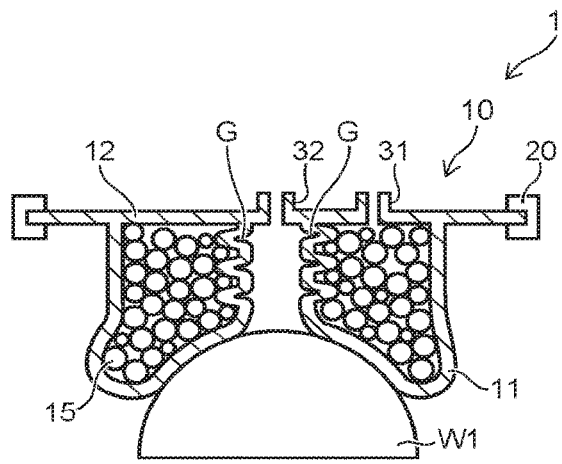

The gripper 10 is flexible. Therefore, when the gripper 10 contacts the workpiece W, the gripper 10 is pressed to spread outward as illustrated in FIG. 3B; and the gripper 10 deforms along the shape of the workpiece W. At this time, for example, the groove G is mashed in the vertical direction. The second space SP2 which was open is sealed by the workpiece W.

Figure 3C:
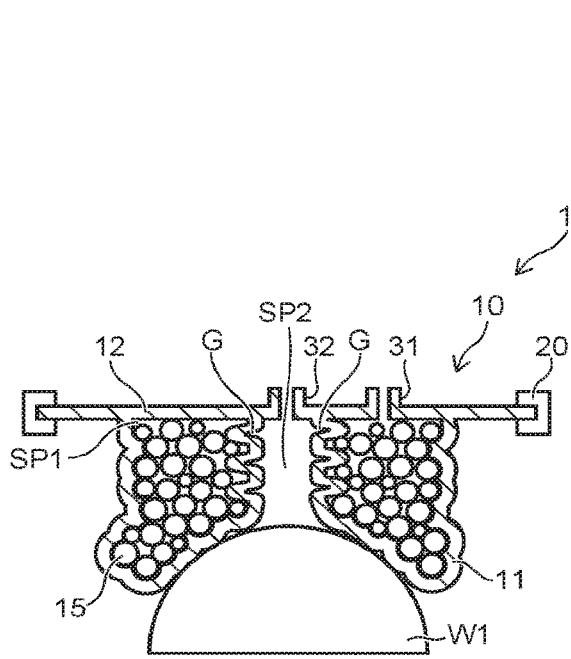

Continuing, the first space SP1 is depressurized via the first port 31. For example, the first space SP1 is depressurized to about 0.1 atmosphere. Thereby, the granular material 15 in the first space SP1 jams and solidifies as illustrated in FIG. 3C.

Figure 3D:
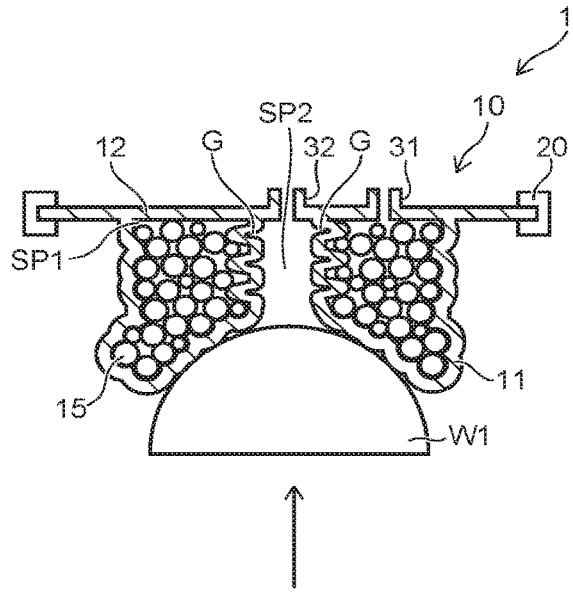

Then, the second space SP2 is depressurized via the second port 32. For example, the second space SP2 is depressurized to about 0.1 atmosphere. Thereby, the workpiece W is suctioned toward the second space SP2; and the workpiece W is gripped. Continuing as illustrated in FIG. 3D, the gripper 10 is raised; and the workpiece W is lifted.

Subsequently, the workpiece W is moved to a prescribed position by moving the gripping tool 1 in the horizontal direction. After moving the workpiece W, the first space SP1 and the second space SP2 are opened to the atmosphere. The gripping force is eliminated thereby; and the workpiece W is released from the gripping tool 1.

By the method described above, the workpiece W to be gripped can be transferred to the prescribed position.

Figure 4A:
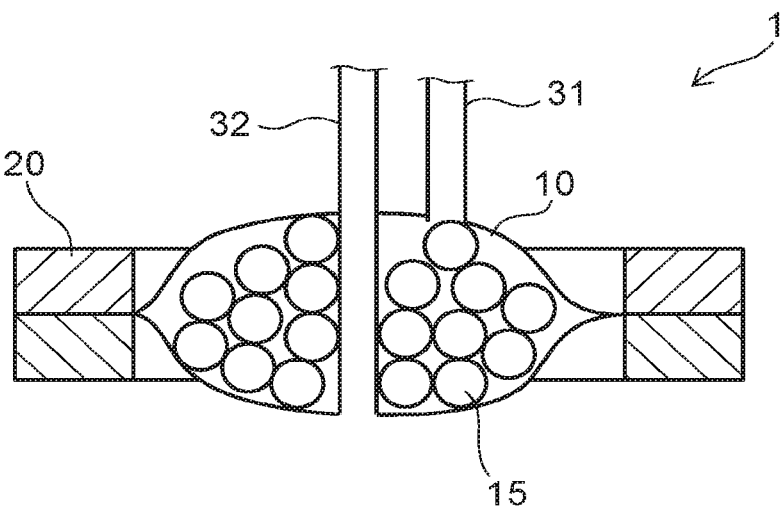
FIGS. 4A to 4C are cross-sectional views illustrating the gripping mechanism of the gripping tool according to the first embodiment.
Figure 4B:
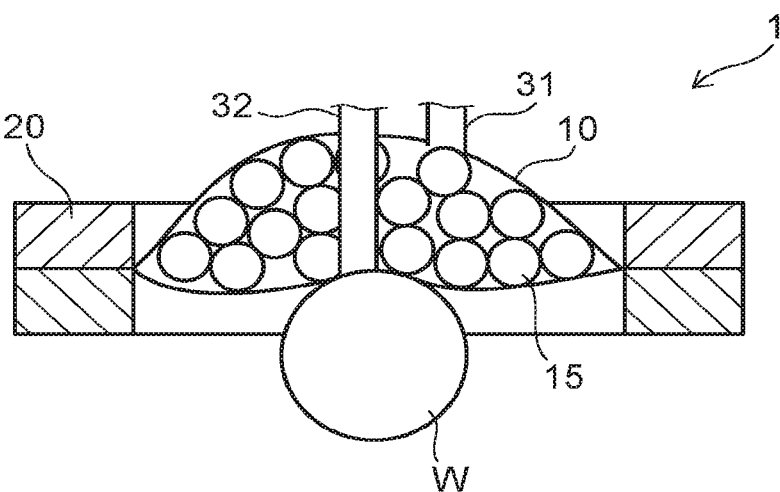
Figure 4C:
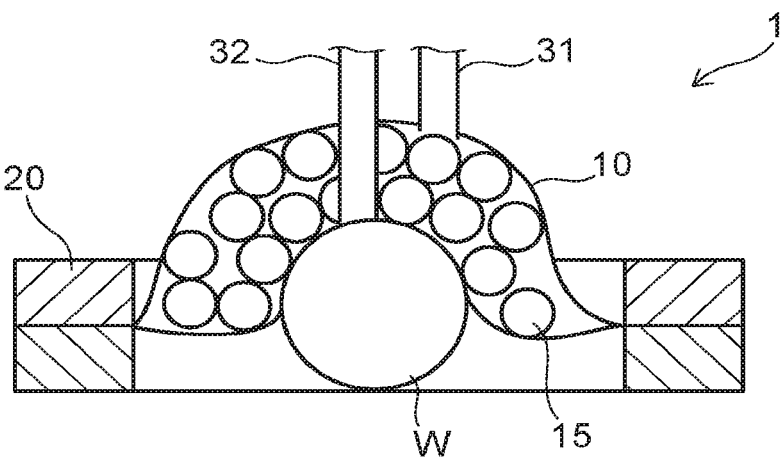

FIGS. 4A to 4C are cross-sectional views illustrating the gripping mechanism of the gripping tool 1 according to the first embodiment.

The gripper 10 of the gripping tool 1 is partially simplified in FIGS. 4A to 4C.

In the gripping tool 1 according to the first embodiment as illustrated in FIG. 4A, the outer perimeter of the gripper 10 is held by the holder 20. Accordingly, as illustrated in FIG. 4B, the gripper 10 can deform upward with respect to the workpiece W when the gripper 10 is caused to contact the workpiece W.

Air is suctioned via the first port 31 and the second port 32 in this state. As illustrated in FIG. 4C, the contact area between the gripper 10 and the workpiece W increases as the gripper 10 deforms further upward with respect to the workpiece W.

Thus, the gripping force when the workpiece W is gripped by the gripper 10 can be increased by the gripper 10 being held to be deformable upward with respect to the workpiece W.

Effects of the first embodiment will now be described with reference to FIGS. 5A and 5B.

Figure 5A:
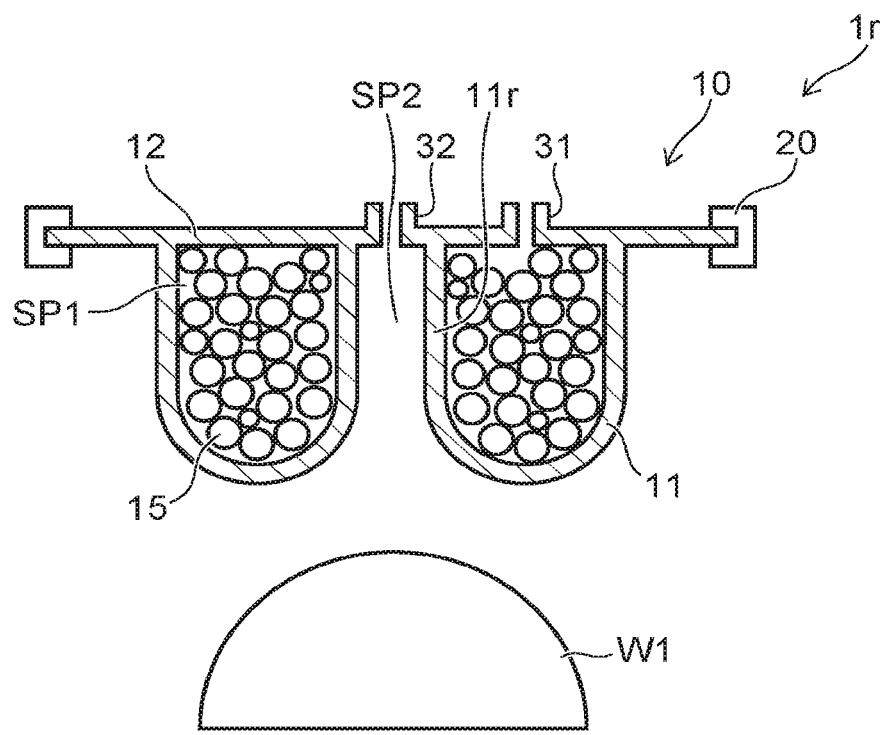
FIGS. 5A and 5B are cross-sectional views illustrating the operation of a gripping tool according to a reference example.
Figure 5B:
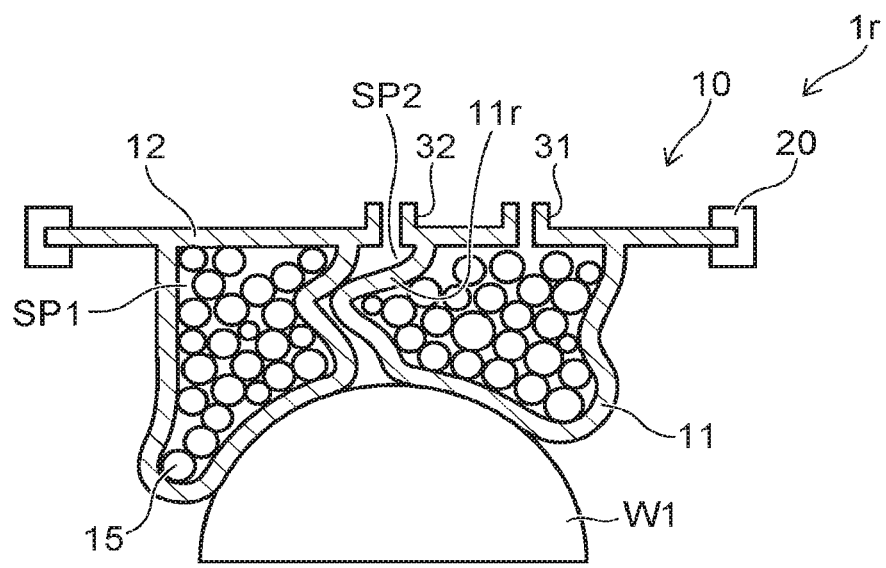

FIGS. 5A and 5B are cross-sectional views illustrating the gripping method using a gripping tool 1r according to a reference example.

The gripping tool 1r according to the reference example differs from the gripping tool 1 in that the groove G is not provided.

As illustrated in FIG. 5A and FIG. 5B, the concave portion 11r bends toward the center of the gripper 10 when the gripper 10 is caused to contact the workpiece W by the gripping tool 1r. There are cases where the second space SP2 which communicates with the second port 32 is sealed thereby. When the second space SP2 is sealed by the gripper 10, the workpiece W is not suctioned to the gripper 10 even when depressurizing via the second port 32. Even if the second space SP2 is not sealed, there is a possibility that the workpiece W is not suctioned easily because the concave portion 11r bends and the second space SP2 becomes narrow. As a result, the gripping force of the gripper 10 decreases.

Conversely, in the gripping tool 1 according to the first embodiment, the groove G is provided in the concave portion 11r. By providing the groove G, the groove G is mashed in the vertical direction as illustrated in FIG. 3B even when a force is applied upward to the concave portion 11r. Therefore, the narrowing and the sealing of the second space SP2 by the concave portion 11r can be suppressed. The gripping force of the gripper 10 can be increased.

The number of the grooves G provided in the concave portion 11r is arbitrary. It is desirable to provide multiple grooves G. By providing the multiple grooves G, the concave portion 11r can expand and contract more in the vertical direction. Thereby, the bending of the concave portion 11r can be suppressed further; and the gripping force of the gripper 10 can be increased further.

FIGS. 6A to 6D are perspective views illustrating a method for manufacturing the gripping tool 1 according to the first embodiment.

Here, an example is described in which the gripping tool 1 is manufactured using a mold unit 60 including a first mold 61, a second mold 62, a third mold 63, and a fourth mold 64.

Figure 6A:
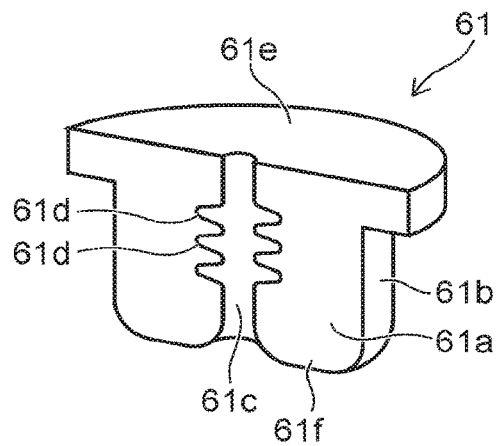
FIGS. 6A to 6D are perspective views illustrating a method for manufacturing the gripping tool according to the first embodiment.
Figure 6B:
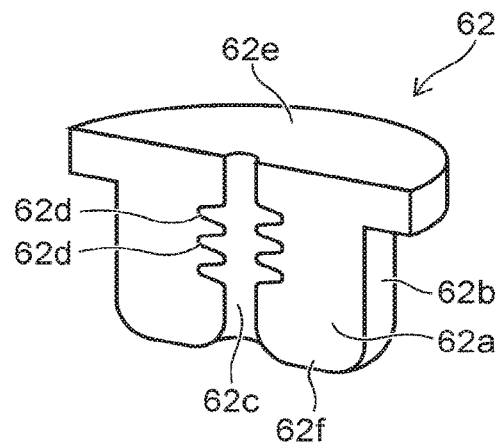
Figure 6C:
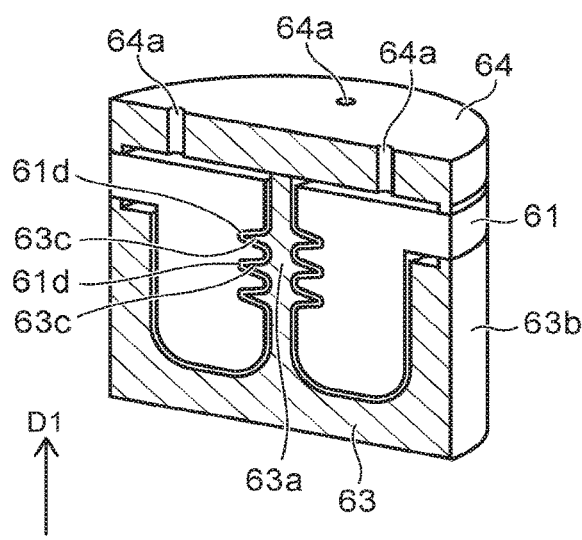

In FIG. 6C, the second mold 62 is not illustrated; and cross sections of the third mold 63 and the fourth mold 64 are illustrated.

The first mold 61 is a semicircular columnar member as illustrated in FIG. 6A. The first mold 61 includes a first curved portion 61b and a first planar portion 61a parallel to a direction D1. The first curved portion 61b is provided at the side opposite to the first planar portion 61a. The diameter of a first end portion 61e at the direction D1 side of the first mold 61 is greater than the diameters of the other portions.

A first groove 61c which extends in the direction D1 is provided in the first planar portion 61a. A first recess 61d which is recessed in a direction crossing the direction D1 is provided in the first groove 61c. Multiple first recesses 61d are provided to be separated from each other in the direction D1. A second end portion 61f at the side opposite to the first end portion 61e is linked smoothly to the first curved portion 61b and the first groove 61c.

The second mold 62 has a configuration similar to that of the first mold 61. Namely, the second mold 62 includes a second planar portion 62a and a second curved portion 62b as illustrated in FIG. 6B. The diameter of a third end portion 62e at the direction D1 side of the second mold 62 is greater than the diameters of the other portions. A second groove 62c is provided in the second planar portion 62a; and multiple second recesses 62d are provided in the second groove 62c. A fourth end portion 62f at the side opposite to the third end portion 62e is linked smoothly to the second curved portion 62b and the second groove 62c.

The first mold 61 and the second mold 62 are overlaid so that the first planar portion 61a and the second planar portion 62a contact each other, and the first groove 61c, the first end portion 61e, and the second end portion 61f respectively oppose the second groove 62c, the third end portion 62e, and the fourth end portion 62f.

As illustrated in FIG. 6C, the third mold 63 includes an extension portion 63a extending in the direction D1, and an outer perimeter portion 63b which is provided around the extension portion 63a and separated from the extension portion 63a. The extension portion 63a is positioned between the first groove 61c and the second groove 62c. A portion of the first mold 61 and a portion of the second mold 62 are surrounded with the outer perimeter portion 63b. A ring-shaped protrusion 63c is provided at the surface of the extension portion 63a. Multiple protrusions 63c are provided in the direction D1. The multiple protrusions 63c respectively oppose the multiple first recesses 61d and the multiple second recesses 62d.

Figure 6D:
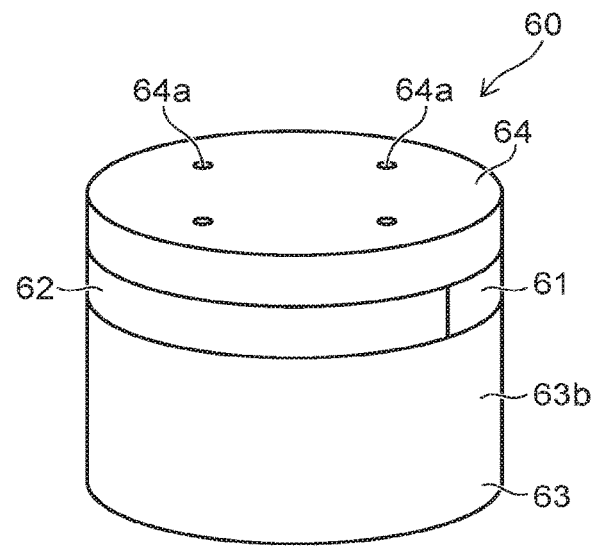

The fourth mold 64 is a flat-plate shaped member. Multiple through-holes 64a which extend in the direction D1 are formed in the fourth mold 64. As illustrated in FIG. 6C and FIG. 6D, the first mold 61 and the second mold 62 are placed between the third mold 63 and the fourth mold 64 in the direction D1.

A gap is provided between the first mold 61, the second mold 62, the third mold 63, and the fourth mold 64. The gripper 10 is made as a resin member by injecting a resin via the through-holes 64a into the gap between these molds and by curing the resin. For example, a silicone resin or an acrylic resin can be used as the resin.

For example, the portion of the cured resin positioned between the third mold 63 and the first mold 61 and between the third mold 63 and the second mold 62 corresponds to the first portion 11. The portion positioned between the protrusion 63c and the first recess 61d and between the protrusion 63c and the second recess 62d corresponds to the groove G. The portion positioned between the fourth mold 64 and the first mold 61 and between the fourth mold 64 and the second mold 62 corresponds to the second portion 12.

The gripping tool 1 illustrated in FIG. 1 and FIG. 2 is obtained by using the holder 20 to fix the outer perimeter of the gripper 10 made in the processes recited above and by providing the first port 31 and the second port 32.

Second Embodiment

Figure 7:
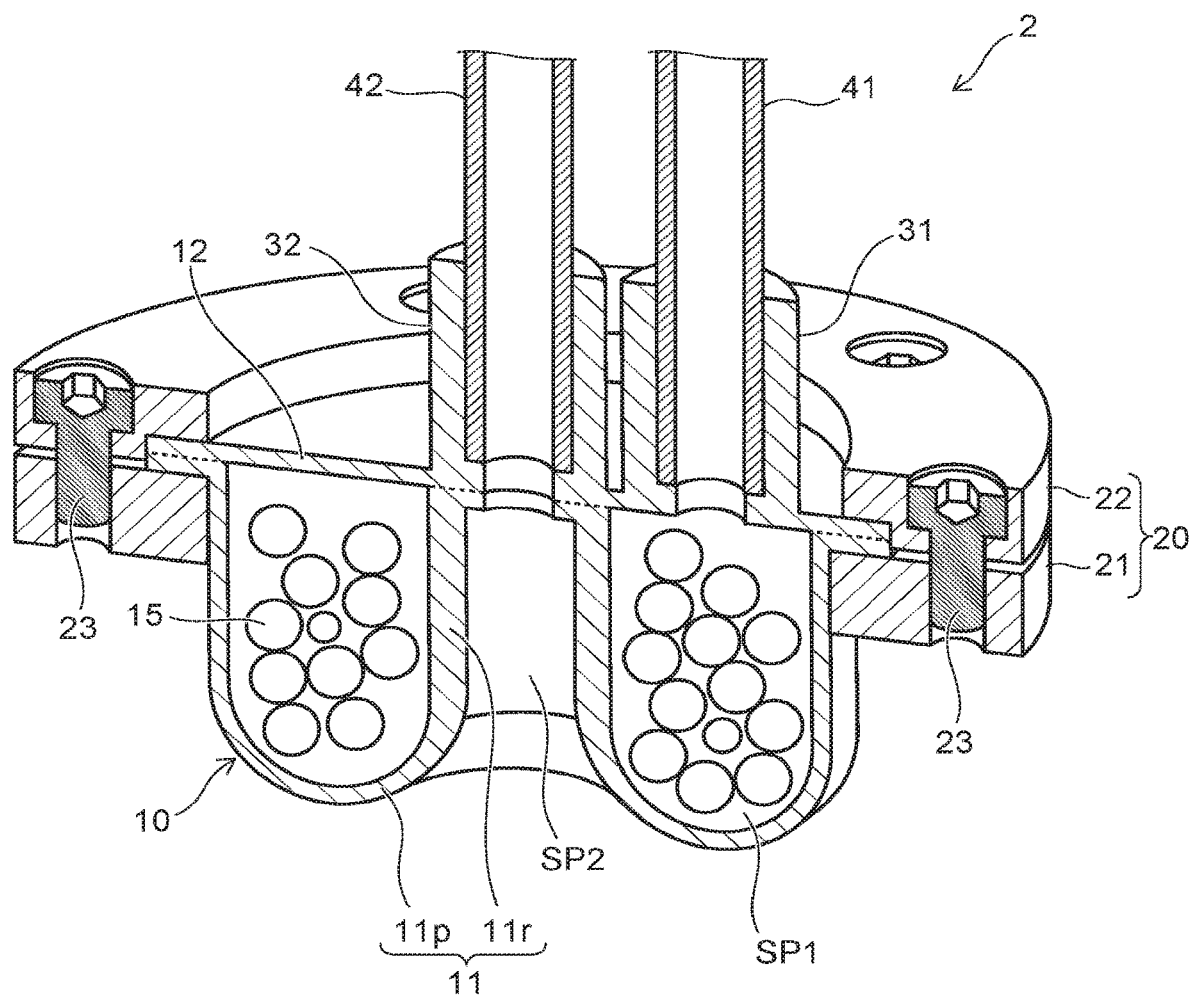
FIG. 7 is a perspective cross-sectional view illustrating a gripping tool according to a second embodiment.

FIG. 7 is a perspective cross-sectional view illustrating a gripping tool 2 according to a second embodiment.

In the gripping tool 2 according to the second embodiment, the rigidity of at least a portion of the concave portion 11r is greater than the rigidity of the convex portion 11p.

For example, as illustrated in FIG. 7, the thickness of the portion of the concave portion 11r along the vertical direction is greater than the thickness of the convex portion 11p. Or, the rigidity of the material included in at least a portion of the concave portion 11r may be higher than the rigidity of the material included in the convex portion 11p. Or, another member may be adhered to at least a portion of the concave portion 11r. These methods can be combined as appropriate.

By setting the rigidity of at least a portion of the concave portion 11r to be greater than the rigidity of the convex portion 11p, the concave portion 11r does not deform easily when the gripper 10 is caused to contact the workpiece. As a result, the gripper 10 does not seal the second space SP2 easily. Thereby, in the embodiment as well, the gripping force can be improved similarly to the first embodiment.

Third Embodiment

Figure 8:
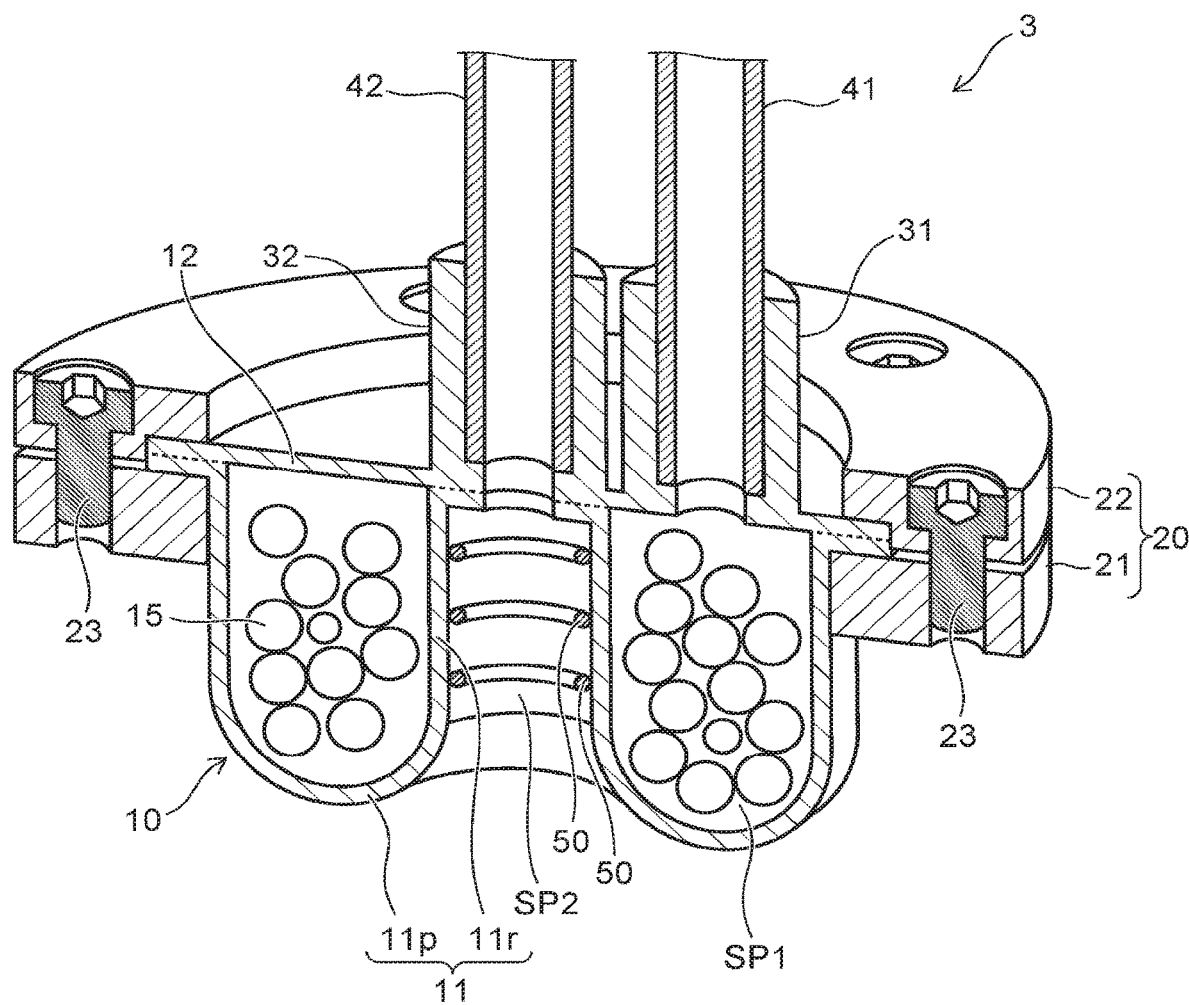
FIG. 8 is a perspective cross-sectional view illustrating a gripping tool according to a third embodiment.

FIG. 8 is a perspective cross-sectional view illustrating a gripping tool 3 according to a third embodiment.

The gripping tool 3 according to the third embodiment includes a ring-shaped member 50 fixed to the concave portion 11r. The ring-shaped member 50 is provided along the concave portion 11r. For example, the exterior form of the ring-shaped member 50 is circular. The direction outward from the center of the ring-shaped member 50 is parallel to the direction outward from the center of the gripper 10. For example, the ring-shaped member 50 is fixed to the concave portion 11r by a bonding agent.

In the example illustrated in FIG. 8, multiple ring-shaped members 50 are separated from each other along the vertical direction. The rigidity of the ring-shaped member 50 is higher than the rigidity of the first portion 11. By fixing the ring-shaped member 50 having the high rigidity to the concave portion 11r, the concave portion 11r does not deform easily when the gripper 10 contacts the workpiece. As a result, the gripper 10 does not seal the second space SP2 easily. Thereby, in the embodiment as well, the gripping force can be improved similarly to the first embodiment.

The ring-shaped member 50 may be fixed to the concave portion 11r inside the gripper 10. The ring-shaped member 50 may be fixed to the concave portion 11r outside the gripper 10. When the ring-shaped member 50 is provided inside the gripper 10, there is a possibility that the granular material 15 may catch on the ring-shaped member 50; the fluidic properties of the granular material 15 may decrease; and the gripping force may decrease. Accordingly, it is favorable to fix the ring-shaped member 50 to the concave portion 11r outside the gripper 10.

Modification

Figure 9:
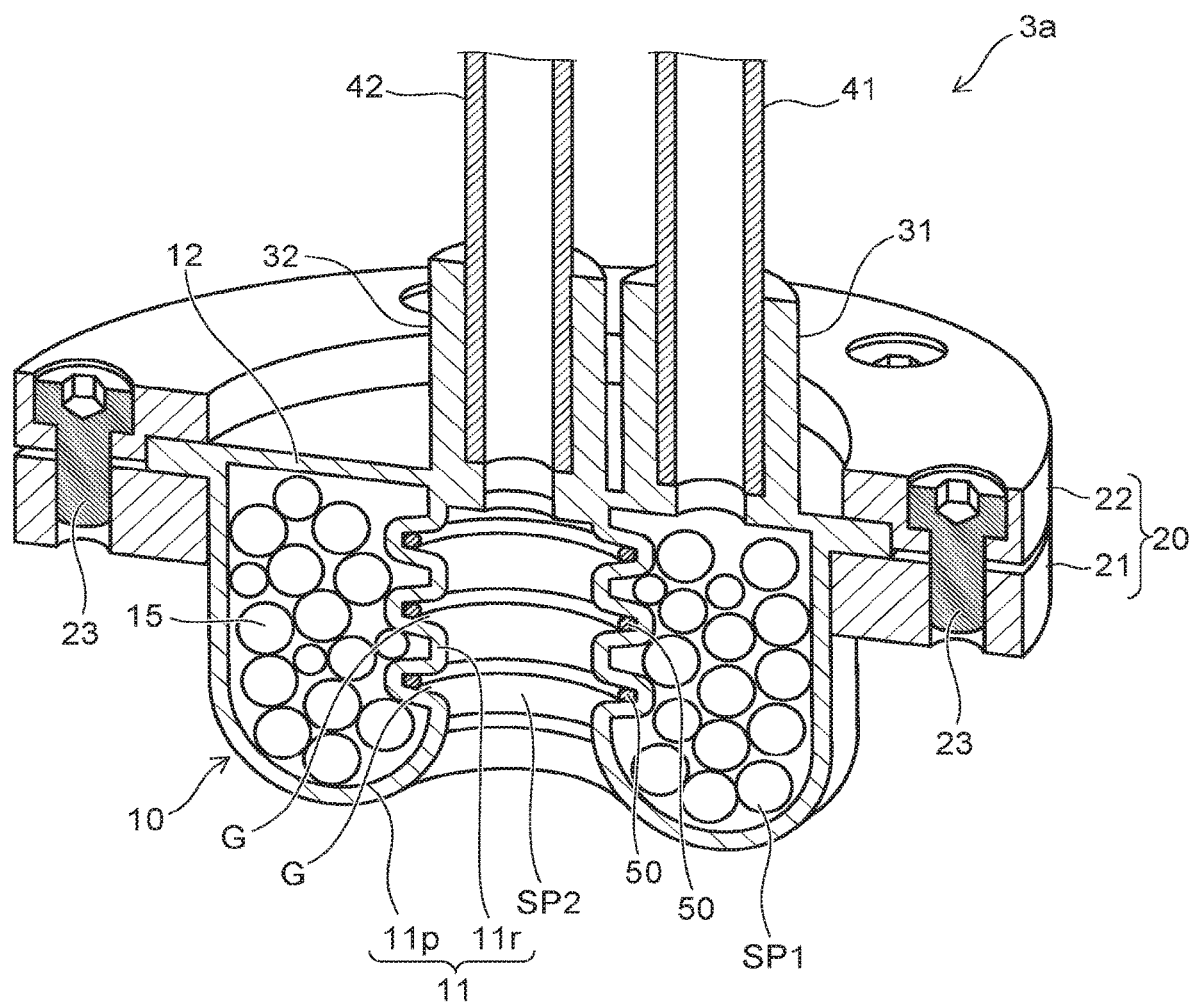
FIG. 9 is a perspective cross-sectional view illustrating a gripping tool according to a modification of the third embodiment.

FIG. 9 is a perspective cross-sectional view illustrating a gripping tool 3a according to a modification of the third embodiment.

The gripping tool 3a according to the modification further includes the groove G similar to that of the gripping tool 1 according to the first embodiment. The groove G is provided in the concave portion 11r; and the ring-shaped member 50 is provided along the groove G. At least a portion of the ring-shaped member 50 is provided inside the groove G. In the example illustrated in FIG. 9, the multiple ring-shaped members 50 are provided respectively inside the multiple grooves G.

By providing the ring-shaped member 50 along the groove G, the concave portion 11r does not deform easily inward. The gripping force can be improved further. Thus, the embodiments described above can be implemented in combination as appropriate. For example, in the gripping tool 3a, the rigidity of at least a portion of the concave portion 11r may be set to be higher than the rigidity of at least a portion of the convex portion 11p.

Fourth Embodiment

Figure 10:
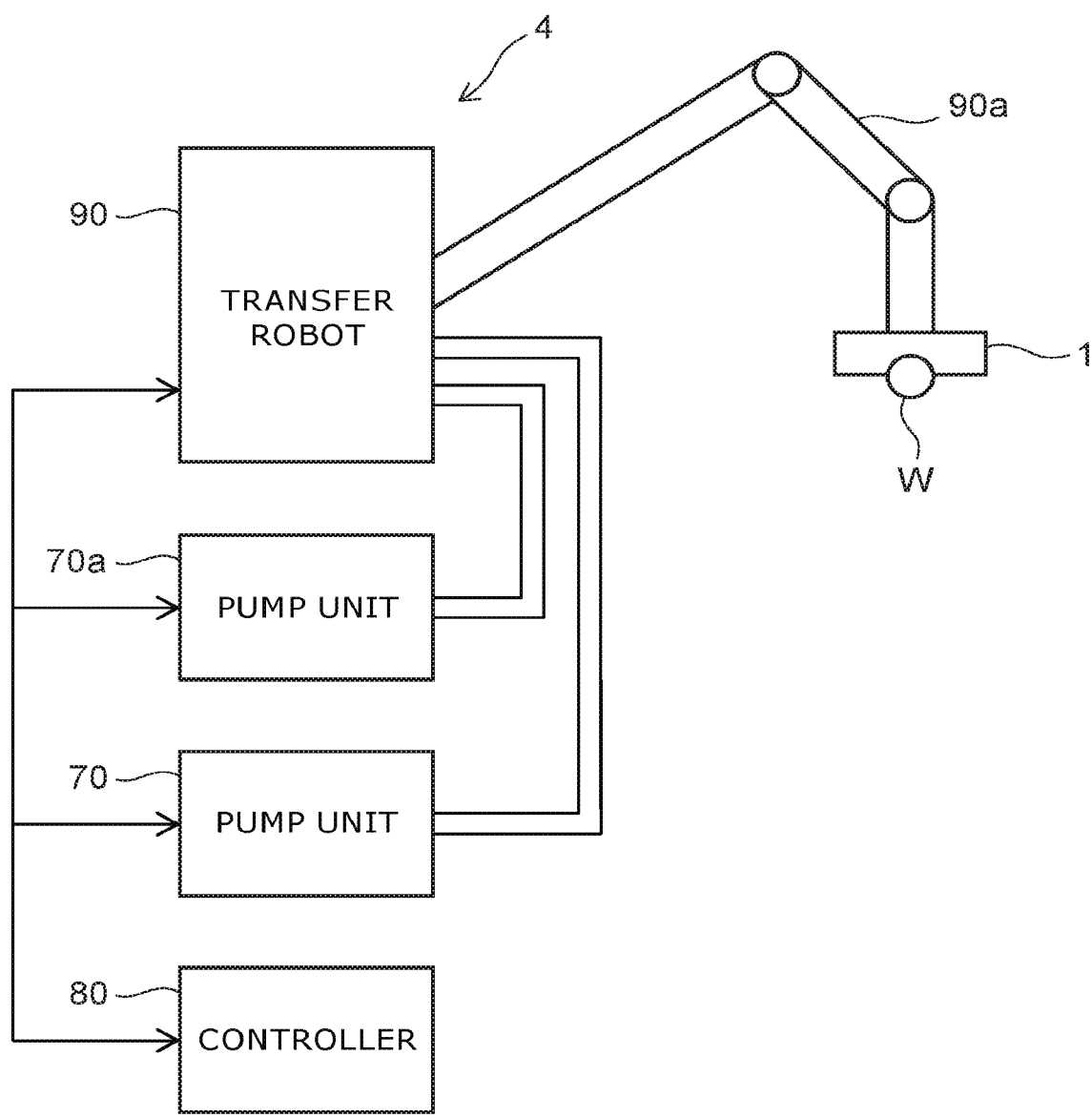
FIG. 10 is a schematic view illustrating the configuration of a gripping system according to a fourth embodiment.

FIG. 10 is a schematic view illustrating the configuration of a gripping system 4 according to a fourth embodiment.

The gripping system 4 according to the embodiment includes the gripping tool 1, a pump unit 70, a pump unit 70a, a controller 80, and a transfer robot 90.

The transfer robot 90 includes an arm 90a. The arm 90a includes, for example, multiple joints; and the gripping tool 1 is mounted to the tip of the arm 90a. The transfer robot 90 operates the arm 90a, grips the workpiece W, and transfers the workpiece W according to commands from the controller 80.

The pump unit 70 is connected to the first pipe 41 of the gripping tool 1 illustrated in FIG. 1. The pump unit 70a is connected to the second pipe 42 of the gripping tool 1. The first space SP1 and the second space SP2 are depressurized and opened to the atmosphere by driving the pump units 70 and 70a according to the commands from the controller 80.

The controller 80 includes a CPU (Central Processing Unit), ROM (Read Only Memory), nonvolatile flash memory, etc. Various calculation processing of the controller 80 is performed in the CPU. Various control algorithms, various constants, etc., necessary for the operation of the gripping system 4 are stored in the ROM. The transfer procedure of the workpiece W, the transfer conditions, etc., are appropriately stored and saved in the flash memory.

The controller 80 controls the operations of the pump unit 70, the pump unit 70a, and the transfer robot 90 by sending commands to the pump unit 70, the pump unit 70a, and the transfer robot 90 according to the transfer procedure stored in the flash memory.

By including the gripping tool 1 having a high gripping force, the gripping system 4 can more reliably grip and transfer the workpiece W. The gripping system 4 may include the gripping tool 2, 3, or 3a instead of the gripping tool 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A gripping tool, comprising:
a gripper,
the gripper being flexible and including:
    a first portion contacting a workpiece,
    a second portion opposing the first portion, and
    a granular material provided between the first portion and the second portion,
the first portion including:
    a concave portion recessed in a first direction, the first direction being from the first portion toward the second portion, and
    a convex portion, the convex portion being provided around the concave portion and protruding in a second direction, the second direction being the reverse of the first direction,
the concave portion including a groove recessed outward from a center of the gripper,
wherein a rigidity of at least a portion of the concave portion is higher than a rigidity of the convex portion.

2. The tool according to claim 1, wherein the tool grips the workpiece by depressurizing an interior of the gripper in a state in which the gripper is caused to contact the workpiece.

3. The tool according to claim 1, wherein
the groove is configured to be mashed in a line direction when the first portion contacts the workpiece, and
the line direction is along a direction connecting the first portion and the second portion.

4. The tool according to claim 1, wherein a plurality of the grooves is provided in the first direction.

5. The tool according to claim 1, wherein the gripper being deformable in a line direction connecting the first portion and the second portion.

6. The tool according to claim 1, further comprising:
a first port communicating with a first space between the first portion and the second portion, the first port being configured to be connected to a first pipe for depressurizing the first space, and
a second port communicating with a second space surrounded with the concave portion and the convex portion, the second port being configured to be connected to a second pipe for depressurizing the second space.

7. A gripping system, comprising:
a robot mechanism including an arm; and
the gripping tool according to claim 1 mounted to a tip of the arm.

8. A gripping tool, comprising:
a gripper,
the gripper being flexible and including:
a first portion contacting a workpiece,
a second portion opposing the first portion, and
a granular material provided between the first portion and the second portion,
the first portion including:
a concave portion recessed in a first direction, the first direction being from the first portion toward the second portion, and
a convex portion, the convex portion being provided around the concave portion and protruding in a second direction, the second direction being the reverse of the first direction,
the concave portion including a groove recessed outward from a center of the gripper, and
further comprising a ring-shaped member,
the groove having a ring configuration and being provided along a circumferential direction,
the circumferential direction is orthogonal to a direction from the center of the gripper toward an outer perimeter of the gripper,
the ring-shaped member being provided along the groove,
a rigidity of the ring-shaped member being higher than a rigidity of the convex portion,
at least a portion of the ring-shaped member being provided inside the groove.

9. A gripping tool, comprising:
a gripper,
the gripper being flexible and including a first portion contacting a workpiece, a second portion opposing the first portion, and a granular material provided between the first portion and the second portion,
the first portion including:
a concave portion recessed in a first direction, the first direction being from the first portion toward the second portion, and
a convex portion, the convex portion being provided around the concave portion and protruding in a second direction, the second direction being the reverse of the first direction,
a rigidity of at least a portion of the concave portion being higher than a rigidity of the convex portion.

10. The tool according to claim 9, wherein the tool grips the workpiece by depressurizing an interior of the gripper in a state in which the gripper is caused to contact the workpiece.

11. The tool according to claim 9, wherein a thickness of the at least a portion of the concave portion is greater than a thickness of the convex portion.

12. A gripping tool, comprising:
a gripper; and
a ring-shaped member,
the gripper being flexible and including:
a first portion contacting a workpiece,
a second portion opposing the first portion, and
a granular material provided between the first portion and the second portion,
the first portion including:
a concave portion recessed in a first direction, the first direction being from the first portion toward the second portion, and
a convex portion, the convex portion being provided around the concave portion and protruding in a second direction, the second direction being the reverse of the first direction,
the ring-shaped member being fixed to the concave portion and having a higher rigidity than the concave portion.

13. The tool according to claim 12, wherein the tool grips the workpiece by depressurizing an interior of the gripper in a state in which the gripper is caused to contact the workpiece.

14. The tool according to claim 12, wherein the ring-shaped member is provided externally to the gripper.

15. The tool according to claim 12, wherein a plurality of the ring-shaped members is provided in the first direction.

16. A gripping tool, comprising:
gripper,
the gripper being flexible and including:
a first portion contacting a workpiece,
a second portion opposing the first portion, and
a granular material provided between the first portion and the second portion,
the first portion including:
a concave portion recessed in a first direction, the first direction being from the first portion toward the second portion, and
a convex portion, the convex portion being provided around the concave portion and protruding in a second direction, the second direction being the reverse of the first direction,
the concave portion including a groove recessed outward from a center of the gripper, and
further comprising a holder holding an outer perimeter of the convex portion and an outer perimeter of the second portion,
inside the holder, the first portion and the second portion being deformable in a line direction connecting the first portion and the second portion.

17. The tool according to claim 16, the first portion is more deformable in the first direction than the outer perimeter of the second portion held by the holder.

18. A gripping tool, comprising:
a gripper,
the gripper being flexible and including:
a first portion contacting a workpiece,
a second portion opposing the first portion, and
a granular material provided between the first portion and the second portion,
the first portion including:
a concave portion recessed in a first direction, the first direction being from the first portion toward the second portion, and
a convex portion, the convex portion being provided around the concave portion and protruding in a second direction, the second direction being the reverse of the first direction,
the concave portion including a groove recessed outward from a center of the gripper,
wherein
a port including a penetrating portion penetrating the second portion and the concave portion,
a first dimension in one direction of the concave portion is longer than a second dimension in the one direction of the penetrating portion, and
the one direction is perpendicular to the first direction.

19. A method for manufacturing a resin member in a mold unit,
the mold unit including:
a first mold including a first planar portion and a first curved portion, the first curved portion being at a side opposite to the first planar portion and being parallel to a first direction, the first planar portion having a first groove extending in the first direction, the first groove including a first recess recessed in a direction crossing the first direction, a second mold including a second planar portion and a second curved portion, the second curved portion being at a side opposite to the second planar portion and being parallel to the first direction, the second planar portion including a second groove extending in the first direction, the second groove having a second recess recessed in a direction crossing the first direction, a third mold including an extension portion and a peripheral portion, the extension portion extending in the first direction and being positioned between the first groove and the second groove, the peripheral portion being provided around the extension portion and surrounding a portion of the first mold and a portion of the second mold, and a fourth mold, the first mold and the second mold being positioned between the third mold and the fourth mold in the first direction, the method comprising:

injecting a resin into a gap between the first mold, the second mold, the third mold, and the fourth mold; and curing the resin.

* * * * *